US011554954B2

(12) United States Patent
Ostuni et al.

(10) Patent No.: US 11,554,954 B2
(45) Date of Patent: *Jan. 17, 2023

(54) PROCESS FOR PRODUCING A SYNTHESIS GAS

(71) Applicant: CASALE SA, Lugano (CH)

(72) Inventors: Raffaele Ostuni, Lugano (CH); Ermanno Filippi, Castagnola (CH)

(73) Assignee: CASALE SA, Lugano (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/091,317

(22) PCT Filed: Apr. 11, 2017

(86) PCT No.: PCT/EP2017/058606
§ 371 (c)(1),
(2) Date: Oct. 4, 2018

(87) PCT Pub. No.: WO2017/190918
PCT Pub. Date: Nov. 9, 2017

(65) Prior Publication Data
US 2019/0152776 A1    May 23, 2019

(30) Foreign Application Priority Data

May 3, 2016    (EP) .................................... 16168144

(51) Int. Cl.
*C01B 3/02*  (2006.01)
*B01D 53/047*  (2006.01)
(Continued)

(52) U.S. Cl.
CPC ............ *C01B 3/025* (2013.01); *B01D 53/047* (2013.01); *B01J 7/02* (2013.01); *B01J 19/0013* (2013.01);
(Continued)

(58) Field of Classification Search
CPC .................................. C01B 3/025; C01B 3/34
(Continued)

(56) References Cited

U.S. PATENT DOCUMENTS 4,005,996 A * 2/1977 Hausberger .............. C10K 3/02
48/197 R
2008/0279763 A1   11/2008 Snyder et al.
(Continued)

FOREIGN PATENT DOCUMENTS

CN    101848979 A    9/2010
CN    103501877 A    1/2014
(Continued)

OTHER PUBLICATIONS

International Preliminary Report for Patentability for International Application No. PCT/EP2017/058606 completed Jul. 23, 2018.
(Continued)

*Primary Examiner* — Douglas B Call
(74) *Attorney, Agent, or Firm* — Dorsey & Whitney LLP (57) ABSTRACT

Process for manufacturing a hydrogen-containing synthesis gas from a natural gas feedstock, comprising the conversion of said natural gas into a raw product gas and purification of said product gas, the process having a heat input provided by combustion of a fuel; said process comprises a step of conversion of a carbonaceous feedstock, and at least a portion of said fuel is a gaseous fuel obtained by said step of conversion of said carbonaceous feedstock, and the Wobbe Index of said fuel is increased by a step of carbon dioxide removal or methanation.

21 Claims, 4 Drawing Sheets

(51) Int. Cl.
| | |
|---|---|
| *B01J 7/02* | (2006.01) |
| *B01J 19/00* | (2006.01) |
| *C01B 3/34* | (2006.01) |
| *C01B 3/54* | (2006.01) |
| *C01B 3/56* | (2006.01) |
| *C01B 3/58* | (2006.01) |
| *C10J 3/46* | (2006.01) |
| *C10J 3/86* | (2006.01) |
| *C01B 3/32* | (2006.01) |

(52) U.S. Cl.
CPC .................. *C01B 3/32* (2013.01); *C01B 3/34* (2013.01); *C01B 3/54* (2013.01); *C01B 3/56* (2013.01); *C01B 3/58* (2013.01); *C01B 3/586* (2013.01); *C10J 3/463* (2013.01); *C10J 3/86* (2013.01); *B01J 2219/00157* (2013.01); *C01B 2203/02* (2013.01); *C01B 2203/0205* (2013.01); *C01B 2203/0233* (2013.01); *C01B 2203/0283* (2013.01); *C01B 2203/042* (2013.01); *C01B 2203/043* (2013.01); *C01B 2203/045* (2013.01); *C01B 2203/0415* (2013.01); *C01B 2203/0445* (2013.01); *C01B 2203/0475* (2013.01); *C01B 2203/0485* (2013.01); *C01B 2203/068* (2013.01); *C01B 2203/0811* (2013.01); *C01B 2203/0816* (2013.01); *C01B 2203/0822* (2013.01); *C01B 2203/127* (2013.01); *C01B 2203/1241* (2013.01); *C01B 2203/1247* (2013.01); *C01B 2203/1294* (2013.01); *C01B 2203/142* (2013.01); *C01B 2203/146* (2013.01); *C10J 2300/093* (2013.01); *C10J 2300/1668* (2013.01); *Y02P 20/10* (2015.11)

(58) Field of Classification Search
USPC ......................................................... 252/376
See application file for complete search history.

(56) References Cited

U.S. PATENT DOCUMENTS

| | | | |
|---|---|---|---|
| 2009/0170968 A1* | 7/2009 | Nahas | C10K 3/006 518/704 |
| 2009/0246118 A1 | 10/2009 | Drnevich et al. | |
| 2010/0120926 A1* | 5/2010 | Robinson | C10K 1/143 518/703 |
| 2011/0000366 A1* | 1/2011 | Koss | F25J 3/0223 95/42 |
| 2013/0047574 A1* | 2/2013 | Kidambi | C01B 17/0404 60/39.12 |
| 2013/0161563 A1 | 6/2013 | Jiang et al. | |
| 2013/0260268 A1* | 10/2013 | Shapiro | H01M 8/0662 429/410 |
| 2014/0117287 A1 | 5/2014 | Ariyapadi et al. | |
| 2016/0356488 A1* | 12/2016 | Goral | F23C 10/04 |

FOREIGN PATENT DOCUMENTS

| | | | |
|---|---|---|---|
| EP | 2065337 A1 | | 6/2009 |
| EP | 2662327 A1 | | 11/2013 |
| FR | 1483711 A | | 6/1967 |
| WO | WO2015090636 | * | 6/2015 |
| WO | 2016071061 A1 | | 5/2016 |

OTHER PUBLICATIONS

International Search Report for International Application No. PCT/EP2017/058606 dated May 4, 2017.
D.J. Huskins: "Online Process Analysis Quality Measurement Instruments", Oct. 31, 1989, Hydrocarbon Processing Press.
Editorial Department of "China Chemical Industry Yearbook": "China Chemical Industry Yearbook", Dec. 31, 2010, China National Chemical Information Center.
Wu Guoguang and others: "Coal Gasification Technology", Oct. 31, 2015, China University of Mining and Technology Press.

* cited by examiner

PROCESS FOR PRODUCING A SYNTHESIS GAS

FIELD OF APPLICATION

The invention concerns a process for producing a hydrogen-containing synthesis gas from a natural gas feedstock, a related plant and a method of revamping of related plants. The invention relates in particular to production of ammonia synthesis gas comprising hydrogen and nitrogen in about 3:1 molar ratio.

PRIOR ART

The production of synthesis gas from a hydrocarbon feedstock usually involves a combined reforming process in which a primary reformer is fed with desulfurized hydrocarbons and steam and a secondary reformer receives the partially reformed gas from the primary reformer and a flow of a suitable oxidant, for example air or oxygen.

The reformed gas exiting the secondary reformer is then typically treated in a series of down-stream equipment items to obtain a synthesis gas with a composition suitable for a specific use.

For example, the synthesis of ammonia ($NH_3$) requires a synthesis gas comprising hydrogen ($H_2$) and nitrogen ($N_2$) in a suitable molar ratio of about 3:1, the so called make-up gas. The term ammonia syngas is commonly used with reference to a synthesis gas with the above composition.

The ammonia syngas is generally produced in a front-end section and the conversion of said synthesis gas into ammonia is carried out in a synthesis loop.

From an efficiency standpoint, the ideally suited hydrocarbon feedstock for the manufacture of ammonia syngas is natural gas, because it is characterized by one of the highest contents of hydrogen among all fossil fuels.

An example of process for the production of ammonia syngas starting from natural gas is disclosed in EP 2 065 337.

The production of ammonia syngas requires combustion of a certain amount of a fuel for generating the reforming heat; a further amount of fuel is typically used to produce steam to power steam turbines which drive machines such as pumps or compressors, e.g. the air compressor and the gas compressor which raise the pressure of the generated make-up gas to the pressure of the ammonia synthesis and the ammonia refrigeration compressor. Ammonia is usually converted into one of its derivatives, usually urea. Also the urea process requires significant amounts of steam as stripping steam and for the carbon dioxide compressor steam turbine.

For this purpose, the common approach of natural gas-based plants is to use a portion of the natural gas feedstock as fuel. Around 30-40% of the total consumption of natural gas is typically used as fuel, in particular for firing of the primary reformer. The plant also includes natural gas-fired auxiliary boilers to generate the additional steam required by the process and the steam turbines.

EP 2 662 327 describes a process for the production of ammonia where natural gas fed to the plant is split substantially into two portions: a first portion (named process fraction) is used as reactant for the reforming process and a second portion (named fuel fraction) is used for the operation of the plant.

However, in recent times limitations of quantity of natural gas and an increasing instability of international hydrocarbon markets have emerged. As a consequence, synthesis gas plants in locations where the natural gas is expensive and/or is available in a limited amount must minimize the consumption of natural gas. Hence, the processes available today may be too expensive to operate, especially where the cost of natural gas is high.

In order to tackle the problem of how to maintain or increase the production of synthesis gas facing a limited supply of natural gas, the interest in alternative hydrocarbon sources technologies has been increasing. Among the available sources, coal is of great interest thanks to its wide availability and inexpensiveness, representing a feasible alternative feedstock for the production of hydrogen-containing synthesis gas and ammonia synthesis gas.

Coal-to-ammonia plants have been proposed, wherein coal is gasified at high pressures and high temperatures, in the presence of steam and a limited amount of oxygen, and provides a synthesis gas containing mainly carbon monoxide and hydrogen. Said gas is then purified through a series of steps including for example removal of particulates, sour gas shift where CO is converted to $CO_2$, removal of $CO_2$ and $H_2S$ in an acid gas removal unit.

A disadvantage of coal to ammonia plants is that they are much more expensive than gas based plants. One of drawbacks of said technique is that the gas originated by the gasification of coal also contains significant amounts of sulphur components (mostly $H_2S$ and COS) and other impurities (including chlorides, HCN, ammonia, metals), which must be completely removed in order to use said gas as process gas. However, the front-end of an existing ammonia plant is generally not able to process such coal-based process gas without an extensive and expensive revamping.

The teaching of the prior art would be in fact to scrap an existing gas-based plant and replace it completely with a new plant based on coal gasification, which is very expensive. Therefore, the prior art coal-to-ammonia technology requires a high investment cost and is not attractive for revamping of existing plants.

A co-pending application of the same applicant describes a process for manufacturing a hydrogen-containing synthesis gas from a natural gas feedstock, wherein the reforming of said natural gas is fuelled by a gaseous fuel obtained from a carbonaceous feedstock, for example by gasification of coal.

A problem which arises in the above case is that the known equipment such as burners of a primary reformer, for example, are generally designed for natural gas or for a combination of natural gas and synthesis loop purge gas. Said gaseous fuel obtained from a carbonaceous feedstock (e.g. coal-derived gaseous fuel), on the other hand, has a lower heat value and lower density than natural gas, resulting in a poor performance in the equipment originally designed to work with natural gas.

Modification or replacement of the equipment, for example of the burners of a primary reformer, as well as the installation of a larger pipe to increase the flow rate, may partially overcome the above drawback, but are expensive especially in a revamping process.

The Wobbe Index (WI) provides an indication of the interchangeability of fuel gases. The WI is defined as the fuel heat value over the square root of specific gravity of the fuel relative to air. The WI can be referred to the higher heating value (upper index) or to the lower heating value (lower index). For example methane has an upper WI of 53.3 $MJ/Nm^3$ and a lower WI of 47.9 $MJ/Nm^3$. The WI of natural gas is slightly greater, for example a typical WI of natural gas is about 53.7 (upper) or 48.5 (lower) MJ/Nm³. The symbol Nm³ denotes cubic meters at standard conditions of 15° C., 1 atm.

For a given orifice, such as the tip of a burner, gas mixtures with the same WI will deliver the same amount of heat.

A typical value of the upper WI for the fuel of steam reformer burners in ammonia plants, which is a mix of natural gas and ammonia synthesis loop purge gas, is 40 MJ/Nm³.

A gaseous fuel as obtainable from gasification of coal, for example, has an upper WI of around 10 MJ/Nm³, i.e. about one fifth of the WI of natural gas and one fourth of the typical value of the steam reformer fuel in ammonia plants. Such a low index affects the performance of the burner and the amount of heat it can deliver. Since the natural gas conversion stage is based on reforming, its performance is heavily affected by the heat that can be delivered.

SUMMARY OF THE INVENTION

The invention aims to solve the above problem. More particularly, the invention aims to provide a process for manufacturing a hydrogen-containing synthesis gas as introduced above, wherein a gaseous fuel obtained from a carbonaceous feedstock has a Wobbe Index closer to the original fuel mix of the burner, thus increasing its interchangeability and avoiding or reducing the need of modification or replacement of the related equipment such as piping and burners.

This aim is reached with a process according to claim 1, wherein the production of said gaseous fuel includes the steps of:
a) gasification of a solid or liquid carbonaceous feedstock into a first gaseous product;
b) a treatment of said first gaseous product to obtain said gaseous fuel, said treatment including at least one of:
b1) a step of removal of carbon dioxide
b2) a step of methanation.

The invention is based on the finding that the Wobbe Index of said gaseous fuel can be increased by removing at least some of the carbon dioxide content of said gas and/or by means of a catalytic methanation step.

The upper Wobbe Index of said gaseous fuel is increased to at least 14 MJ/Nm³, preferably at least 19 MJ/Nm³ and even more preferably at least 24 MJ/Nm³.

Said removal of carbon dioxide is carried out preferably by means of a step of carbon dioxide adsorption on a regenerable solid adsorbent material. Preferred adsorbent materials include without limitation activated carbons, zeolites and potassium promoted hydrotalcites. A preferred method of regeneration of the adsorbent of the carbon dioxide adsorption process is pressure swing ($CO_2$ PSA).

Depending on the adsorbent material and on the adsorption cycle, the adsorption temperature may be in the range 25° C. to 400° C., the lower temperatures being preferred for zeolites and also to knock out as much water as possible upstream of the carbon dioxide adsorptive step.

Removal of carbon dioxide may be done also according to other less preferable possibilities, such as by selective permeation of carbon dioxide from the feed side to the permeate side of a semipermeable membrane. Membrane separation is less preferable than adsorption, due to the difficult separation of carbon dioxide from hydrogen, entailing that relatively pure carbon dioxide can generally be achieved at more modest recovery than adsorption. Separation of carbon dioxide by absorption is also less preferable than adsorption, due to the high thermal input required for solvent regeneration, which in the end decreases the overall coal gasification process efficiency and increases the amount of coal to be gasified to deliver a fixed amount of heat to the natural gas conversion process.

A preferred feature of the invention is that carbon dioxide separated from the gaseous fuel has a high purity, preferably more than 90% molar and more preferably more than 95% molar or more than 98% molar. Separation of substantially pure carbon dioxide is advantageous to avoid removal of components such as carbon monoxide or methane or hydrogen, which contribute to the heat value of the gas, and to enable further uses of the carbon dioxide, e.g. as chemical feedstock.

A further preferred feature is that only a fraction of the carbon dioxide is separated from the gaseous fuel. It has been surprisingly found by the applicant that a bulk separation of the carbon dioxide entails significant benefits as regards the increase of the WI of the gas. According to an embodiment said fraction is not greater than 50%. According to a preferred embodiment said fraction is not greater than 75%.

An advantage of the bulk carbon dioxide removal is a great reduction of cost, size and especially energy consumption of the carbon dioxide removal (e.g. adsorption) unit. For example, a $CO_2$ PSA operated for bulk $CO_2$ removal needs no or very moderate recycle compression energy, and has less or no requirements for carrying out the adsorbent regeneration under sub-atmospheric conditions (i.e. under vacuum).

Even more importantly, the applicant has found that adsorption units operated for bulk carbon dioxide removal can produce a relatively pure carbon dioxide and does not separate components with calorific value from the gas, such as $CH_4$, CO and $H_2$.

PSA units are known in the field of gas purification but are normally used for complete removal of carbon dioxide, reaching a very low concentration of residual carbon dioxide (down to only a few parts per million) in the treated gas, generally because carbon dioxide is detrimental to downstream purification stages. However, the conventional syngas PSA has the drawback of capturing also a large fraction of the hydrogen (typically 15%), and most of the methane and carbon monoxide, with two negative effects: producing an impure $CO_2$, and decreasing significantly the heat value of the gas.

An aspect of the invention is that carrying out only a bulk carbon dioxide removal, for example leaving even 20% of carbon dioxide in the gas, is still extremely advantageous for the purpose of solving the aforementioned problem of adjusting the Wobbe Index of the gaseous fuel, as can be understood from the examples. Moreover, the residual carbon dioxide in the gas downstream of the bulk removal is not a concern for the combustion.

A further advantage of the embodiment of the bulk carbon dioxide removal of the invention is the reduced amount of carbon dioxide discharged in the atmosphere with the combustion flue gas.

Another possibility to carry out the invention is to treat the gas produced by the gasification in at least one catalytic methanation step. Said step of catalytic methanation converts carbon oxides and hydrogen ($H_2$) into methane and water. The water product can easily be separated e.g. by condensation. Consequently, it increases density and content of methane of the gaseous fuel; a greater density and a greater content of methane contribute to increasing the Wobbe Index.

A preferred embodiment is to desulfurize the syngas produced in the coal gasifier to the level required by the methanation catalyst, adjust its temperature to a suitable value for a catalytic methanation step, for example between 250 and 500° C., and then treat it in at least one catalytic methanation step. The so obtained methanated gas is cooled below the dew point and excess water is separated from it by condensation to increase the Wobbe Index.

A further advantage of methanation is that a greater content of methane and less hydrogen make the fuel more suitable for use in a gas turbine or a gas engine. Accordingly, part of said fuel can be more easily used in gas turbines of ammonia plants.

Another advantage of the methanation step is that it enables a more efficient recovery of the reaction heat. In fact, while the combustion heat of the syngas can only be recovered down to the temperature at which the flue gas is discharged from the flue gas stack, typically 200° C., the methanation heat can be recovered almost entirely downstream of the methanation reactors. Moreover, since the methanation step of the invention occurs at higher than atmospheric pressure, e.g. at 10 bar, also some of the water condensation heat can be recovered. Said increased heat recovery can be used to generate steam and ultimately enable a reduction of the total coal consumption.

Said steps of carbon dioxide removal and methanation can be carried out alone or in combination. The advantage of carrying out the two steps in combination is the possibility to achieve a higher Wobbe Index, which is a better solution of the technical problem. In the latter case, the step of catalytic methanation is preferably carried out upstream of said bulk removal of carbon dioxide, because the bulk $CO_2$ separation can be achieved more easily from a methane-rich gas than from the hydrogen-rich syngas by means of selective adsorption. Moreover a bulk removal downstream of the methanation step at the same carbon dioxide separation rate, achieves a higher WI of the gas. The latter advantage can be appreciated from example 2 below.

Any of said steps of carbon dioxide and methanation is preferably carried out after a desulfurization step. Desulfurization, carbon dioxide adsorption and methanation steps may occur at similar temperatures, or at different temperatures. The inlet temperature to each of the steps may be adjusted by means of suitable steps of cooling or heating if appropriate.

Said process of gasification is preferably carried out in a fluid bed.

A further aspect of the invention is that the ash and/or fine particulate matter produced during fluid-bed gasification is subject to a further combustion in separate boiler, which is preferably a coal-fired circulating fluid bed boiler. Even more preferably, said separate boiler produces steam and said steam is used directly in said step of gasification and/or in steam turbines and/or in said step of conversion of natural gas and/or in the syngas purification.

Still another aspect of the invention concerns the moderator of the temperature of the fluid-bed gasification process. In the prior art, said moderator is usually water, in the form of steam. According to an aspect of the present invention, said moderator is other than water. A preferred moderator for the present invention is nitrogen. Nitrogen, as a temperature moderator of the fluid-bed gasification process, can be admitted by means of a dedicated feed of nitrogen, or together with oxygen. Oxygen and nitrogen can be fed together by feeding air or oxygen-enriched air.

The applicant has found that a fluid-bed gasifier is advantageous for the above mentioned gasification of a solid or liquid carbonaceous feedstock. However, a drawback of the available fluid-bed gasifiers is that they release a significant amount of unconverted carbon in the form of ash or fine particulate matter. Said ash is typically collected at the bottom of the gasifier, while particulate matter can be filtered out from the syngas downstream of the gasifier. Depending on the fluid bed gasifier technology and on the operating conditions, the unconverted carbon in the ash and particulate matter may range between 2% and 10% of the coal feed to the gasifier. Besides the loss of efficiency, and the necessity to increase the size of the coal based plant correspondingly for a given final gas heat value, the residual carbon in ash is also a safety problem. A too high value of residual carbon in ash may lead to explosions in the ash pile, for example.

The above problem is solved by the provision of a separate coal-fired boiler which exploits the heat value of the ash and particulate matter. A coal boiler, particularly a circulating fluid bed coal boiler is able to convert all the carbon contained in the feed, because it provides an oxidative environment (i.e. it operates with an excess of oxidant) and at higher temperature than a fluid bed gasifier.

In some cases it may be difficult to treat the carbon containing ash and particulate matter in a coal boiler, if not enough coal is burnt in the boiler compared to the ash or fines. This problem is solved in a preferred embodiment of the invention wherein said coal-fired boiler provides the steam for gasification and/or the natural gas conversion step and/or the gas purification step and/or steam turbines. Accordingly, the fraction of heat provided by combustion of the carbon containing ash in the boiler is only part of the heat provided by combustion of the boiler fuel.

Moreover, the applicant has found that a coal-fired boiler providing heat for the gasification and/or gas conversion and/or gas purification and/or steam turbines enables the advantage of a higher efficiency than firing the gas produced in the gasification step in a gas boiler. This is evident in example 3. For the above reasons, the combination of a gasifier with a coal-fired boiler is particularly advantageous.

The use of a moderator other than water has further advantages. In a conventional steam-moderated fluid bed gasifier, the steam condenses during the subsequent cooling of the gas produced by the gasification, usually prior to desulfurization. Recovering water from this process condensate requires expensive treatment units. If desulfurization is carried out at a high temperature, the steam does not condense but this means it cannot be recovered and, as a consequence, the process consumes a large amount of fresh water, which can be highly undesirable especially in certain geographical locations. Using a different moderator, such as nitrogen, eliminates the above drawbacks.

One further problem of coal gasification syngas is that it contains some amount of sulphur in the form of carbonyl sulphide (COS), usually between 5 and 10% of the total sulphur. Carbonyl sulphide is not completely captured by most $H_2S$ wash systems. Residual carbonyl sulphide in the desulfurized gas may contaminate the carbon dioxide, or poison the methanation catalyst, and ultimately result in excessive sulphur emissions when the gas is used as fuel e.g. in the steam reformer.

One aspect of the invention concerns a process to solve this problem. This aim is reached with a process wherein the above mentioned process step b) also includes: a step of catalytic hydrolysis of the carbonyl sulfide (COS), producing a gas with a reduced content of carbonyl sulfide and an increased content of hydrogen sulfide ($H_2S$), and a step of $H_2S$ separation by means of a wash with a liquid solution with affinity to capture $H_2S$, preferably an MDEA wash selective for $H_2S$ over $CO_2$, that produces a sour $H_2S$-rich stream and a gas stream with reduced $H_2S$ content, and feeding the gas stream with reduced $H_2S$ content to any of step b1 or step b2.

An advantage of this embodiment is that a deeper desulphurization of the fuel can be achieved, which decreases the $SO_3$ (acid) condensation temperature of the flue gas and permits lower flue gas stack temperatures, i.e. a more efficient utilization of the fuel gas in the heaters.

The invention provides that natural gas can still be used as process feedstock for the production of the hydrogen-containing synthesis gas, while fuel is at least partially supplied by the conversion of the carbonaceous feedstock. Accordingly, one of the major advantages of the invention is that the natural gas previously used as a fuel can be redirected for use as process feedstock.

Said heat input may include a process heat, e.g. of a primary reformer, and/or heat for production of steam to drive steam turbines for compressors, pumps or the like.

Said conversion of the carbonaceous feedstock denotes partial oxidation reactions carried out in the presence of an oxygen-containing stream and usually of water or steam. Preferably the gaseous fuel from said conversion contains carbon monoxide and hydrogen, being suitable for replacing at least partially the natural gas-based fuel commonly used in the prior art.

Said carbonaceous feedstock preferably comprises at least one among coal, lignite, coal-derived coke, petroleum coke and a liquid such as heavy fuel oil.

The above are available at moderate cost in many geographical areas and in such areas represent an economically viable alternative to natural gas fuel.

Preferred applications of the invention include: a process for making ammonia starting from natural gas; a process for making ammonia and urea (ammonia/urea process); a process for making methanol; processes for making other synthesis gas derived products, such as hydrogen or carbon monoxide or Fischer-Tropsch products or oxo-alcohols or gasoline through methanol.

Conversion of natural gas (process gas) may include reforming or partial oxidation of said natural gas into a reformed gas or partially oxidized gas, respectively.

Preferably said conversion of natural gas includes a reforming step in a reforming section. Said reforming section may include a steam reformer. According to various embodiments, said reforming section may include at least one of a primary steam reformer, and optionally a secondary reformer, the latter being fed with air, oxygen or enriched air. In some embodiments, the reforming section includes an auto-thermal reformer (ATR). A pre-reformer may also be included in any of the above embodiments.

In one of the embodiments of the invention, said reforming section only comprises a steam reformer i.e. a primary reformer without a subsequent secondary reformer. Reforming performed solely in a primary steam reformer is also termed pure reforming. Preferably, pure reforming is carried out at relatively low pressure (i.e. 10-30 bar at the reformer catalyst tubes outlet) and high temperature (i.e. more than 850° C. at the reformer catalyst tubes outlet), in order to maximize the production of hydrogen per unit of natural gas used for the process fraction. According to some embodiments, a step pre-reforming may be included in the pure reforming.

Embodiments with pure reforming are advantageous in particular when the hydrogen-containing gas is used to make methanol or to make ammonia in an ammonia-urea plant. An ammonia-urea plant is where some or all of the ammonia is further reacted with carbon dioxide to form urea.

The advantages of the pure reforming in combination with the invention are discussed in the following paragraphs.

In the methanol production, it is desired that the make-up gas has a molar ratio between ($H_2$–$CO_2$) and ($CO+CO_2$) equal to 2. Pure steam reforming, however, produces a gas having said ratio equal to 3, which means that hydrogen is in excess and the syngas need to be balanced. One way of balancing the methanol make-up syngas is to combine the steam reforming with oxygen auto-thermal reforming, as known in the art. The invention provides a source of $CO_2$ which can be used to this purpose. $CO_2$ can be recovered by bulk removal from the effluent of the conversion process of the carbonaceous feedstock and added to the make-up gas, to balance the excess hydrogen. Hence, the invention allows producing a balanced methanol make-up gas with a pure steam reforming, which is less expensive and consumes less natural gas (as process gas) than a conventional primary and secondary setup. In other words, the recovered $CO_2$ provides part of the carbon for the product methanol, thus reducing the natural gas consumption as to the process fraction.

In the prior art, the excess hydrogen is recovered with the purge of the synthesis loop and used as a fuel. By balancing the make-up gas, the invention allows using the full amount of hydrogen as a process gas (i.e. to make methanol) instead of fuel, the necessary fuel being furnished by the conversion of a carbonaceous feedstock. It follows that the natural gas consumption of the whole plant (as amount of gas/tons of methanol produced) is reduced compared to a prior art with primary and secondary reforming. For example the consumption may be 25% lower.

In the ammonia-urea production, the pure reforming would result in a lack of $CO_2$ for urea synthesis. The invention solves this drawback thanks to the $CO_2$ recoverable from the effluent of the conversion process of a carbonaceous feedstock, thus allowing the use of the pure steam reforming.

In other words, the conversion of a carbonaceous feedstock provides a convenient route for additional $CO_2$ production, hence a means of making up said shortage of $CO_2$ and permitting complete conversion of the ammonia produced into urea.

Limitations of using pure reforming in an ammonia-urea plant, such as lack of nitrogen for the ammonia synthesis, lower overall energy efficiency and lower single train syngas capacity other than lack of $CO_2$ for urea synthesis, are fully compensated by the significant reduction in natural gas consumption as to process fraction.

Further ways to reduce the natural gas consumption, according to the invention, include: increasing the steam-to-carbon ratio (e.g. to values higher than 3), reducing the purge gas leaving the synthesis loop of the ammonia plant, installing an additional (e.g. third) water-gas shift reactor or installing a hydrogen recovery unit (HRU). Preferably, but not exclusively, the above features are combined with the performing of a pure steam reforming.

A further aspect of the invention is that a low temperature and low-pressure gasifier can be successfully used. A low temperature/low-pressure (LT/LP) gasifier is understood as operating at no more than 1000° C. and no more than 20 bar.

In the prior art, said LT/LP gasifiers are known to suffer the drawback of larger residual amount of unreacted methane ($CH_4$) or other light hydrocarbons (e.g. ethane, $C_2H_6$) in the effluent Thanks to the invention, the overall efficiency is not affected by this drawback since the effluent of the gasifier is used as fuel (not as process gas) and said unreacted methane or other hydrocarbons increases the heating value. On the other hand, a LT/LP gasifier has a lower cost and lower consumption of oxidant and coal for a given gas fuel output, compared to a gasifier of the same capacity but working at a higher temperature and/or pressure.

According to some embodiments of the invention, a methane-rich stream can be separated from the gasifier effluent at appropriate points. This methane-rich stream can be recycled back as reforming feedstock (process gas) to further reduce the natural gas consumption, lowering the consumption of gas as process fraction. According to other embodiments, said methane-rich stream is used to provide part of the fuel required to drive a gas turbine or gas engine. Gas turbines or gas engines operating on a methane-rich gas are cheaper, more common and more efficient than those operating on syngas containing high percentages of $H_2$, especially in the power range up to 50 MW which is typical of chemical production facilities.

The gasifier can be operated with air or oxygen or a mixture thereof as the oxidant. In case of oxygen or oxygen-enriched air, the heating value of the produced fuel gas is higher than with air, and the flame temperature achievable by combustion of the fuel gas is higher.

Further aspects of the invention concern the treatment of the gaseous fuel before combustion, for example to remove impurities such as solid particles, sulphur compounds, methane and carbon dioxide.

Solid residues from the gasification process, i.e. ash and unconverted carbon, are partly removed from the gasifier, while fine particulate matter still present in the gaseous fuel downstream the gasifier may be removed in a cyclone or gas filter or by direct contact with water. The gasifier may be advantageously of the ash-agglomerating type.

Sulphur may be contained in the carbonaceous feedstock (e.g. coal). A certain amount of sulphur in the feedstock may cause the formation of compounds such as hydrogen sulphide ($H_2S$) and COS during the conversion of feedstock into fuel. At least a partial removal of sulphur compounds from the fuel gas is desirable for environmental reasons and to avoid sour condensation of the flue gas which attacks the exchanger surfaces in the reformer, fired heaters and boilers.

An advantage of the invention over the coal-to-chemicals process is that the tolerable amount of sulphur in the fuel gas is significantly greater (e.g. two orders of magnitude) than in synthesis gas (process gas), meaning that simplified sulphur removal techniques can be used. A simple and cheap sulphur separation method such as in-situ desulphurization or warm desulphurization process based on sulphur adsorption may be used, as better described below. Said processes would not be suitable for a coal-to-chemicals plant, because they would not meet the strict gas purity requirements of the downstream sections.

In a particular embodiment of the invention, at least part of the sulphur contained in the carbonaceous feedstock is removed in situ within the gasifier. The gasifier is additionally supplied with a stream of a suitable sorbent such as dolomite ($MgCa(CO_3)_2$) or limestone ($CaCO_3$) and an amount of sulphur present in the feedstock is absorbed by the sorbent typically in the form of calcium sulphide. The spent sorbent is discharged from the gasifier for further treatment or disposal.

Besides the apparent simplification of the process, which does not require dedicated downstream treatments for sulphur removal, the in situ desulphurization also has the following advantages.

First, the gas is advantageously fired at a temperature above the dew point (e.g. at 300° C.) since the change in water vapor contained in the flue gas (derived from the residual water vapor in the fuel) is small. Cooling of the gas below the dew point (i.e. around 200° C.) would instead require expensive equipment due to the formation of a sour and corrosive process condensate containing sulphur compounds and $NH_4Cl$. In addition, the condensate would contain higher hydrocarbons and alcohols, relatively difficult to eliminate from the water. According to said embodiment, the above problems are avoided, which means higher reliability of the process and absence of significant adverse effects on the downstream units.

Firing the gas from the gasifier at a temperature higher than the dew point is also more efficient due to the recovery of the gas full enthalpy, on top of the combustion, Otherwise, at least part of the water vapor latent heat would be lost.

According to another embodiment, sulphur compounds (mainly $H_2S$ and COS) in the gaseous fuel leaving the gasifier are adsorbed on a suitable sorbent (e.g. a metal oxide sorbent like zinc oxide). The sorbent is preferably loaded and then regenerated in a circulating fluid bed. Said process is preferably carried out at high temperatures, i.e. higher than the gas dew point, thereby obtaining the same advantages above. The sulphur is separated for example as sulphur dioxide ($SO_2$).

In a further embodiment of the invention, the gaseous fuel leaving the gasifier and containing sulphur compounds is contacted in a gas liquid absorber, with a liquid able to separate the sulphur components from the gas, such as an amine solution. The rich liquid is discharged from the absorber for external regeneration, with optional production of sulphuric acid (e.g. by means of the Wet Sulphuric Acid process) or, more preferably, production of elemental sulphur by a catalytic sulphur recovery process (i.e. Claus Process) or a suitable biological process.

In other embodiments, said gaseous fuel containing $H_2S$ is subjected to a biological process, which directly provides elemental sulphur.

The load of the above desulphurization processes may be reduced by carrying out water-gas shift in sour conditions, which converts sulphur compounds (e.g. COS) into hydrogen sulphide ($H_2S$), or by first hydrolysing COS and then subjecting it to a "sweet" water-gas shift. Another related advantage is that carbon dioxide is removed prior to combustion and $CO_2$ emissions into atmosphere are reduced.

As explained above, the gaseous fuel from the gasifier may also contain a significant amount of unreacted methane (e.g. 5% molar or greater) and smaller amounts of other hydrocarbons, such as e.g. ethane. A methane-rich stream is advantageously separated from the fuel stream after the desulphurization process by a suitable recovery process, such as cryogenic separation or separation through membrane.

The carbon dioxide removed from the gaseous fuel can be addressed to specific uses, according to some embodiments. For example carbon dioxide can be used for the production of urea in an ammonia-urea integrated plant.

The gaseous fuel, typically depleted in its sulphur content as described above, is fed preferably to one or more burners installed in one or more of the following devices: a radiant section of a primary reformer; a convective section of a primary reformer; a desulfurizer pre-heater arranged to preheat said natural gas before desulphurization and subsequent reforming; a process fired heater; an auxiliary steam generator; a steam superheater; an HRSG (Heat Recovery Steam Generator) cooling the exhaust of a gas turbine; a gas turbine (for power generation or for driving a machine such as a compressor).

In the embodiments featuring the removal of hydrogen sulphide within the gasifier, the partly desulfurized gas leaving the gasifier may be fed to one or more of the above mentioned users after a simplified treatment including a cooling step and removal of entrained particles, without further treatment.

The invention also concerns a related plant and method of revamping according to the claims.

One of the advantages of the invention is the use of a low-cost hydrocarbon source, such as coal, for the provision of the fuel, while the more valuable natural gas is entirely directed to the process line. The investment cost for implementation of the coal gasification section is significantly lower than the investment cost for a coal-to-chemical plant.

This advantage is important also for a revamping of an existing plant. For example, a coal-to-chemical approach would totally replace natural gas with coal, leading however to a high investment cost for meeting the purity requirements of process gas. The present invention provides that coal-derived fuel gas replaces the amount of natural gas originally used as a fuel fraction (typically 30-40% of the input), which is of more economic interest. Hence, the invention provides a rather inexpensive way to drastically reduce the total natural gas consumption or increase the capacity for a given (available) amount of natural gas.

By increasing the Wobbe Index of the gaseous fuel, the invention provides an increased interchangeability of the gaseous fuel with natural gas. Hence, for example, a primary reformer can be fuelled with said coal-derived gaseous fuel without replacing the original burners. Thanks to the greater density, the need to install large piping is reduced or avoided.

Generation of coal-derived fuel via gasification in combination with a coal boiler is more advantageous than simply providing a coal-fired boiler to replace the natural gas-fired auxiliary boiler, for the following reasons:
  more natural gas fuel can be replaced with coal-derived fuel gas,
  coal gasification can also be successfully applied to stand-alone plants, where there is no, or minimal firing of the auxiliary boiler,
  when applied as a revamp, it does not require replacement of the fired heaters or the auxiliary boiler.

A further advantage is the environmentally friendly use of a carbonaceous feedstock, such as coal. Impurities are removed in the gasification process or downstream thereof, and a relatively pure stream of fuel is provided. Said impurities mainly comprise sulphur which gets converted to hydrogen sulphide and carbonyl sulphide, and other compounds such as $CO_2$, HCN, $NH_3$ and metals. Removal of said impurities before combustion is advantageous being much easier and more practical than removal from flue gas of a coal boiler.

Another advantage of the present invention is that the gasifier can be run at relatively low pressure, since the typical fuel pressure required at the burners is 3 to 5 bar. This reduces the capital cost of the gasifier and downstream equipment, and the capital cost for compression of the oxidant. Moreover, in oxygen-fired embodiments, oxygen with a moderate purity can be used thereby reducing the cost and consumption for air separation. The air separation unit may even be a PSA (pressure swing) or a VPSA (vacuum pressure swing) or membrane, and not necessarily a cryogenic air separation unit (ASU). Moreover, the purity requirements for the fuel are much less stringent than for syngas to be used in chemical synthesis.

The invention will be further elucidated by the following description of preferred embodiments thereof, given by way of non-limiting examples.

DETAILED DESCRIPTION

Figure 1:
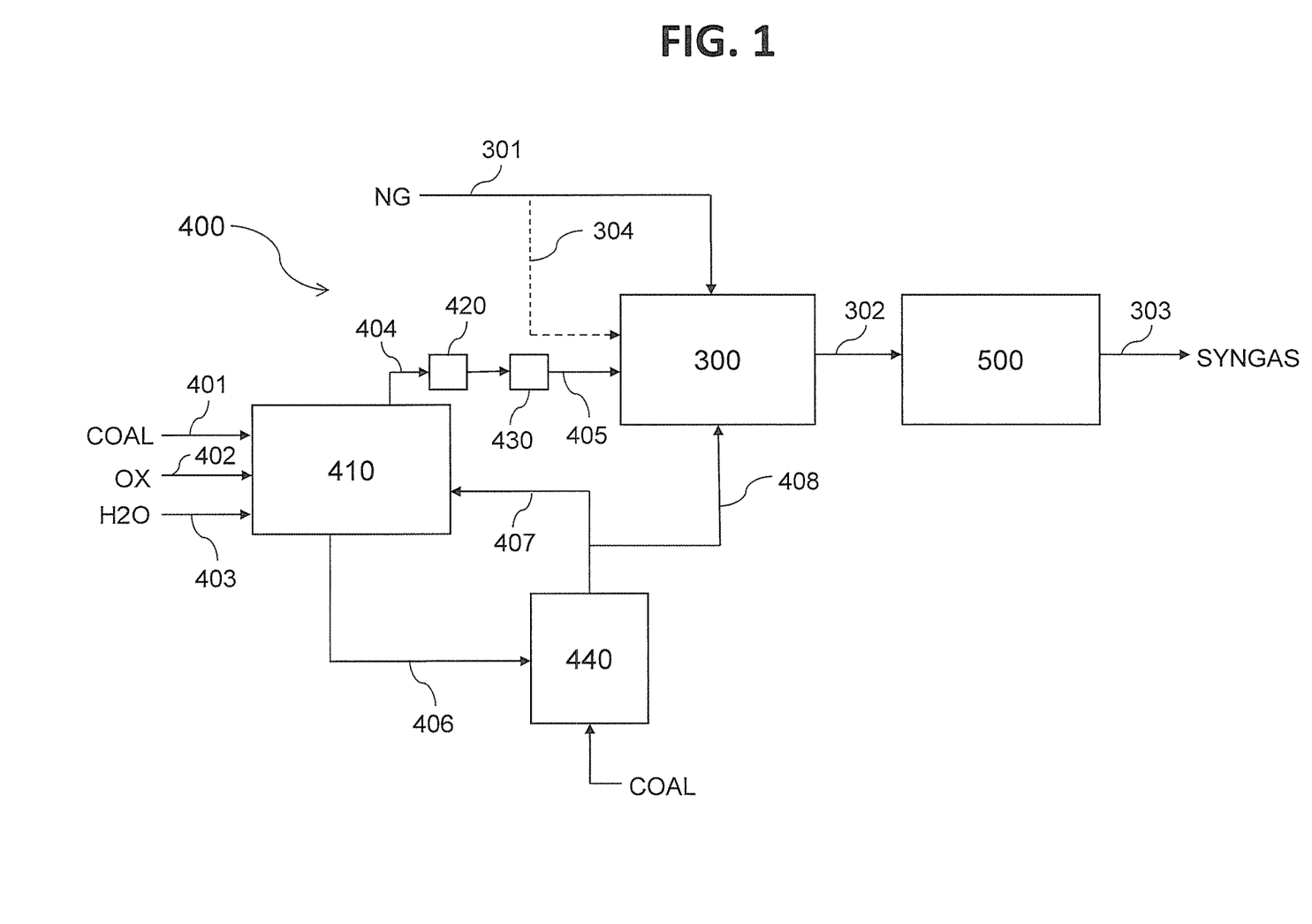
FIG. 1 is an illustrative scheme of the process for the production of hydrogen-containing synthesis gas according to an embodiment of the invention.

FIG. 1 illustrates a block scheme of a process for producing a hydrogen-containing synthesis gas according to an embodiment of the invention.

The process is carried out in a plant comprising basically: a reforming section 300; a coal gasification section 400; a gas purification section 500.

The reforming section 300 converts a natural gas feedstock 301 into a gas mixture 302, which is purified in the purification section 500 to obtain a product gas 303. Said product gas 303 for example is a makeup gas for the synthesis of ammonia.

The purification section 500 preferably comprises a shift section, a $CO_2$ removal section and optionally a methanation section.

The coal gasification section 400 comprises a section 410 which includes a fluid-bed gasifier suitable to convert a solid feedstock, for example coal, into a raw gas, and equipment for the treatment of said raw gas, for example to remove solid matter and sulphur compounds. Further to said section 410, the coal gasification section 400 comprises a $CO_2$ removal unit 430, a methanator 420, a coal-fired boiler 440.

A coal feedstock 401, with an oxidant 402 such as air or oxygen and water or steam 403, is converted into a first gas product 404. After a passage through the methanator 420 and $CO_2$ removal unit 430, a gaseous fuel 405 with a greater Wobbe Index is obtained.

Ash and particulate matter 406 discharged from the gasifier of the section 410 are further combusted in the coal-fired boiler 440, to produce steam 407 for the gasification process and/or steam 408 for the reforming process.

The coal boiler 440 may produce steam for the purification section 500 and it may also produce steam for other plant sections not shown in the figure, such as e.g. steam turbines or the ammonia synthesis section.

The gaseous fuel 405 provides at least part of the total amount of fuel directed to the reforming section 300. Accordingly, the total amount of the feedstock 301 required for a given production rate of ammonia is reduced. Alternatively, a larger amount of the feedstock 301 is available for the process, namely for generation of the product gas 303, hence the production of ammonia may be increased.

Optionally, a portion of the fuel to the reforming section 300 may be still taken from the natural gas feed 301. Said portion (also called fuel fraction) is represented with a dotted line 304 in FIG. 1.

The section 400 may optionally comprise a shift reactor upstream the $CO_2$ removal section 420 to convert carbon monoxide into carbon dioxide.

Figure 2:
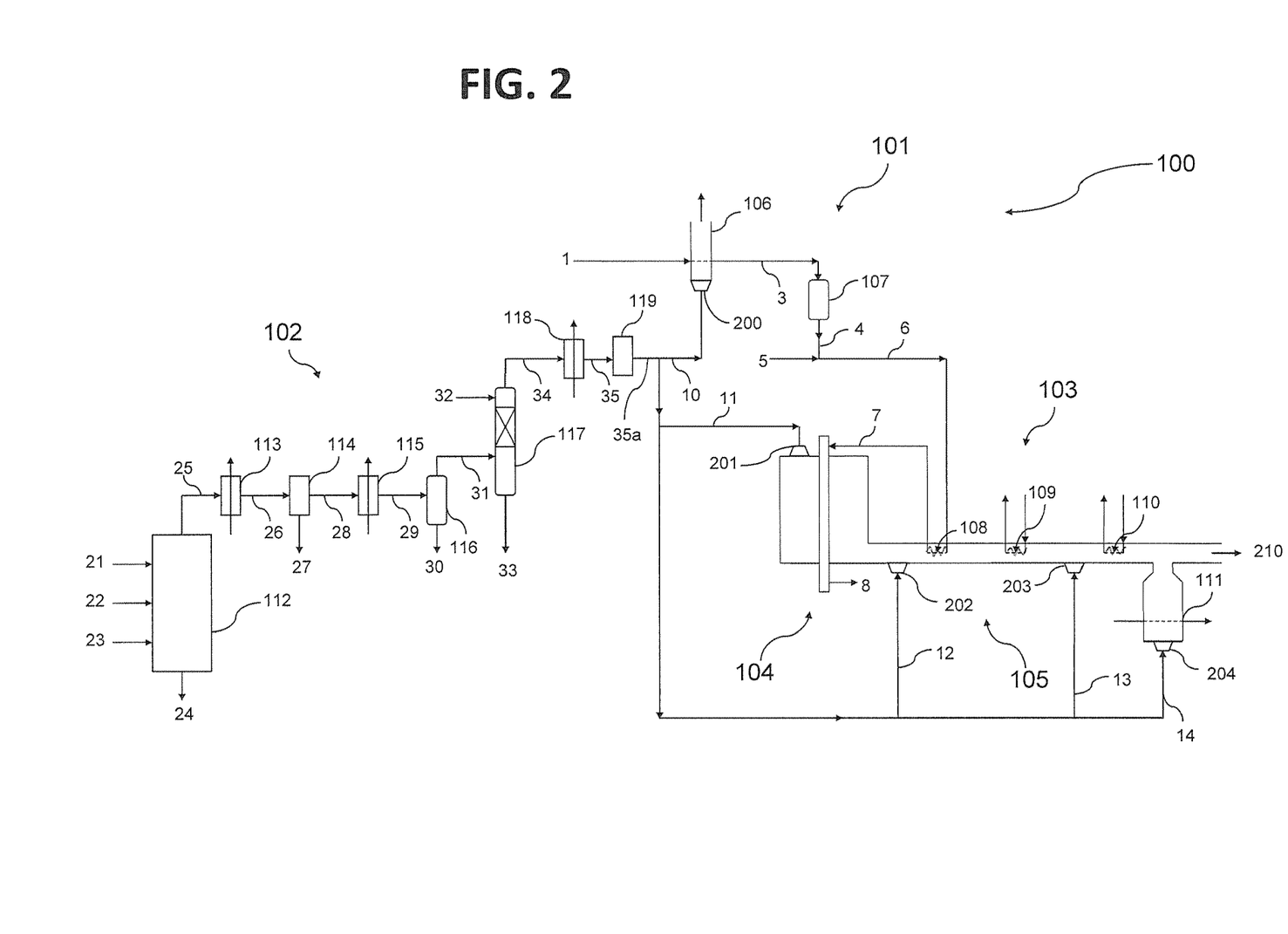
FIG. 2 is a scheme of the front-end section of an ammonia plant according to a first embodiment.

FIG. 2 shows the front-end section of an ammonia plant, according to an exemplary embodiment of the invention.

A front-end 100 of an ammonia plant comprises a first section 101 for the production of a reformed gas 8 from a natural gas feedstock 1, and a second section 102 for the gasification of a coal feedstock 21 and generation of a gaseous fuel 35a.

Said first section 101 comprises a primary reformer 103. Said primary reformer 103 includes a radiant section 104 and a convective section 105.

The section 101 also includes a pre-heater 106 and a desulfurizer 107 upstream said primary reformer 103.

The natural gas 1 enters the pre-heater 106, where it is heated to a first temperature, e.g. around 350° C. The heated natural gas 3 is subsequently directed to said desulfurizer 107, resulting in a desulfurized natural gas 4.

Said gas 4 is mixed with superheated steam 5 to obtain a process gas 6.

Said process gas 6 is fed to the convective section 105 of the primary reformer 103 and it is further heated e.g. around 500° C. in a heat exchange coil 108.

The heated process gas 7 is subsequently fed to the radiant section 104 of the primary reformer 103, containing an array of tubes filled with catalyst for conversion into a hydrogen-containing synthesis gas. The radiant section 104 is provided with a series of burners 201 generating the reforming heat for the aforementioned conversion.

The convective section 105 of the primary reformer 103 substantially recovers heat from the flue gas generated by said burners, which leaves the reformer 103 at line 210. In particular, due to the high temperatures of said flue gas, the convective section 105 is mainly used to superheat the steam and to heat the process air feed to a secondary reformer (not shown in the figure). For these reasons, the convective section 105 comprises the aforementioned heat exchange coil 108, at least one steam superheater coil 109 and a heat exchange coil 110 for the process air.

FIG. 2 also shows an auxiliary boiler 111 separated from the reforming section 103 and producing additional steam. It should be noted that this setup is purely illustrative and several variants are possible.

A gaseous fuel 35 is generated in the second section 102 by gasification of the coal feedstock 21.

More in detail, said second section 102 comprises a gasifier 112 and a series of purification equipment for removing undesirable impurities, e.g. a cyclone or gas filter 114 and hydrogen sulphide adsorber 117.

The coal feedstock 21, an oxidant stream 22 and steam or water 23 are fed to said gasifier 112, where they react at a high temperature (typically around 1000° C. or higher) and deliver a gaseous product 25 containing hydrogen, carbon monoxide and impurities like sulphur, nitrogen and mineral matter.

A continuous stream 24 of ash that may contain unconverted carbon is discharged from the bottom of said gasifier 112 to prevent the accumulation of solids in the gasifier 112 itself. Said stream 24 can be further combusted in a separate boiler such as the boiler 440 of FIG. 1, for example a coal-fired circulating fluid bed boiler.

The gaseous product 25 free of most solid particles leaves the gasifier 112 from the top and is passed through a heat recovery unit 113. The resulting cooled synthesis gas 26 flows through said cyclone or gas filter 114, which removes fine particulate matter 27. The resulting clean synthesis gas 28 leaves the cyclone 114 and flows to an arrangement of heat exchangers 115, where it is cooled with an optional heat recovery to near ambient temperature and condensed unreacted steam 30 is removed in a separator 116.

Subsequently, the cooled gas 31 leaving the separator 116 enters said absorber 117, in which it is scrubbed with a solvent 32 in order to remove hydrogen sulphide. The lean solvent 32 is typically an amine solution. Elemental sulphur may be recovered from this hydrogen sulphide by a suitable catalytic sulphur removal process (not shown in the figure). The loaded solvent is removed as stream 33 for external regeneration.

Said removal of hydrogen sulphide in the absorber 117 may optionally be carried out by means of a biological process.

The scrubbed gas 34 mainly containing CO and $H_2$, leaving the top of the absorber 117, is optionally reheated in a heat exchanger 118 resulting in the gaseous fuel 35.

Said fuel 35 is further treated to increase its Wobbe Index, for example in a PSA $CO_2$ removal unit 119, resulting in the fuel gas 35a which has a greater Wobbe Index.

Said fuel gas 35a fuels the burners 201 of the radiant section 104 and, if present, the burners 200 of the desulfurizer preheater 106, the burners 202, 203 of the convective section 105 and the burners 204 of the auxiliary steam generator 111.

FIG. 2 illustrates an embodiment where the fuel gas 35a is split into portions from 10 to 14, each supplying one of the aforementioned burners. In particular:

portion 10 fuels the burner 200 of the desulphurizer preheater 106;
portion 11 fuels the burner 201 of the radiant section 104;
portion 12 fuels the burner 202, provided to control the temperature of the stream 6 fed to the convective section 105;
portion 13 fuels the burner 203, provided to control the temperature of the superheated steam generated in the coil 110 of the convective section 105;
portion 14 fuels the burner 204 of the auxiliary steam generator 111.

Figure 3:
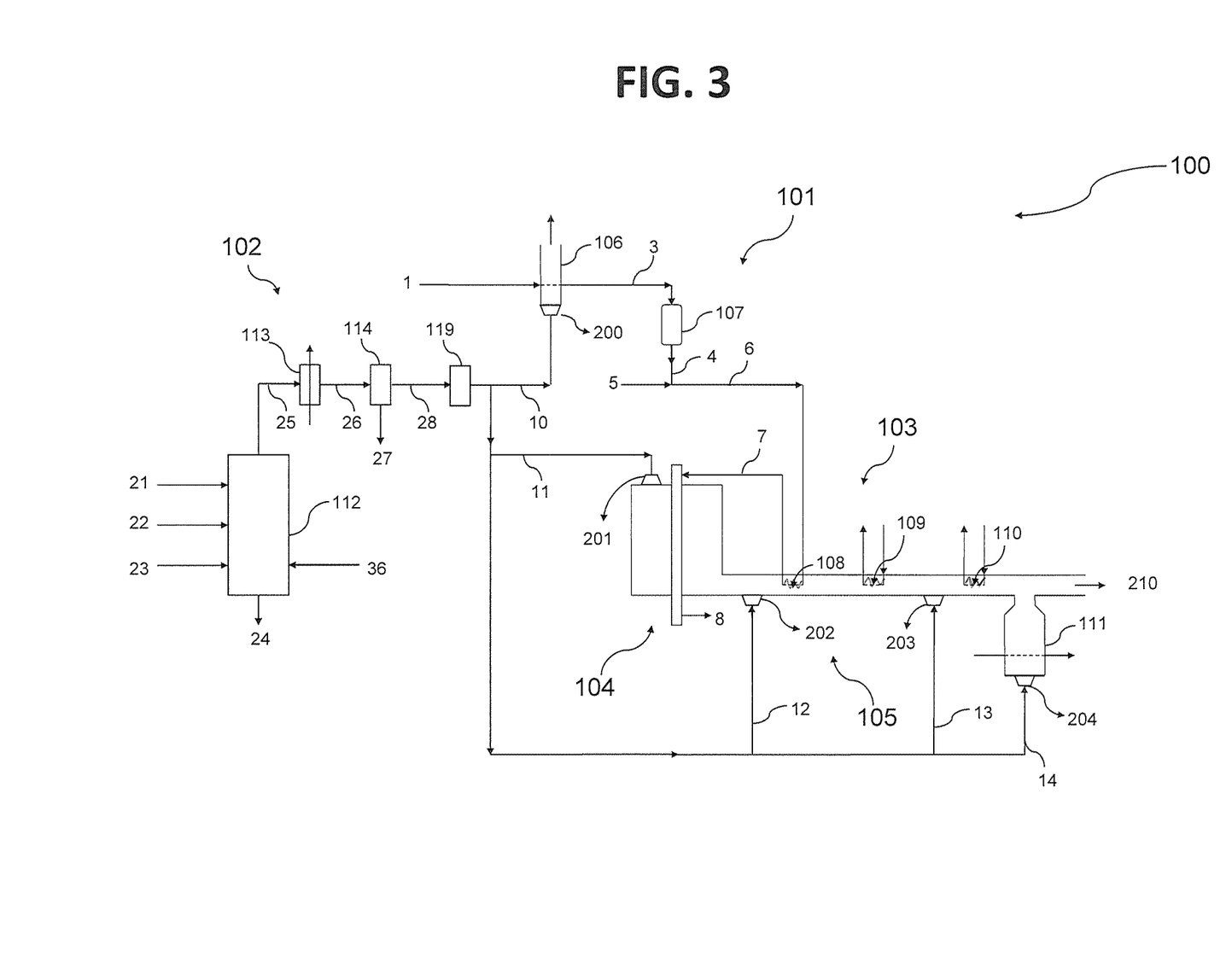
FIG. 3 is a scheme of the front-end section of an ammonia plant according to a second embodiment.

FIG. 3 shows another embodiment of the present invention where items similar to those of FIG. 2 are indicated by the same reference numbers.

The gasifier 112 is additionally supplied with a stream 36 of sulphur sorbent, typically limestone, in order to remove most of the sulphur present in the coal feedstock 21.

The spent sorbent is discharged from the bottom of the gasifier 112 together with ash and unconverted carbon in stream 24.

After passing through a heat recovery unit 113, a cyclone 114, a synthesis gas 28 substantially free of sulphur and solid particles is obtained. Here, said gas 28 passes through the $CO_2$ removal unit 119 to increase the Wobbe Index.

Other embodiments comprise a methanator in addition to, or instead of, said $CO_2$ removal unit 119.

Figure 4:
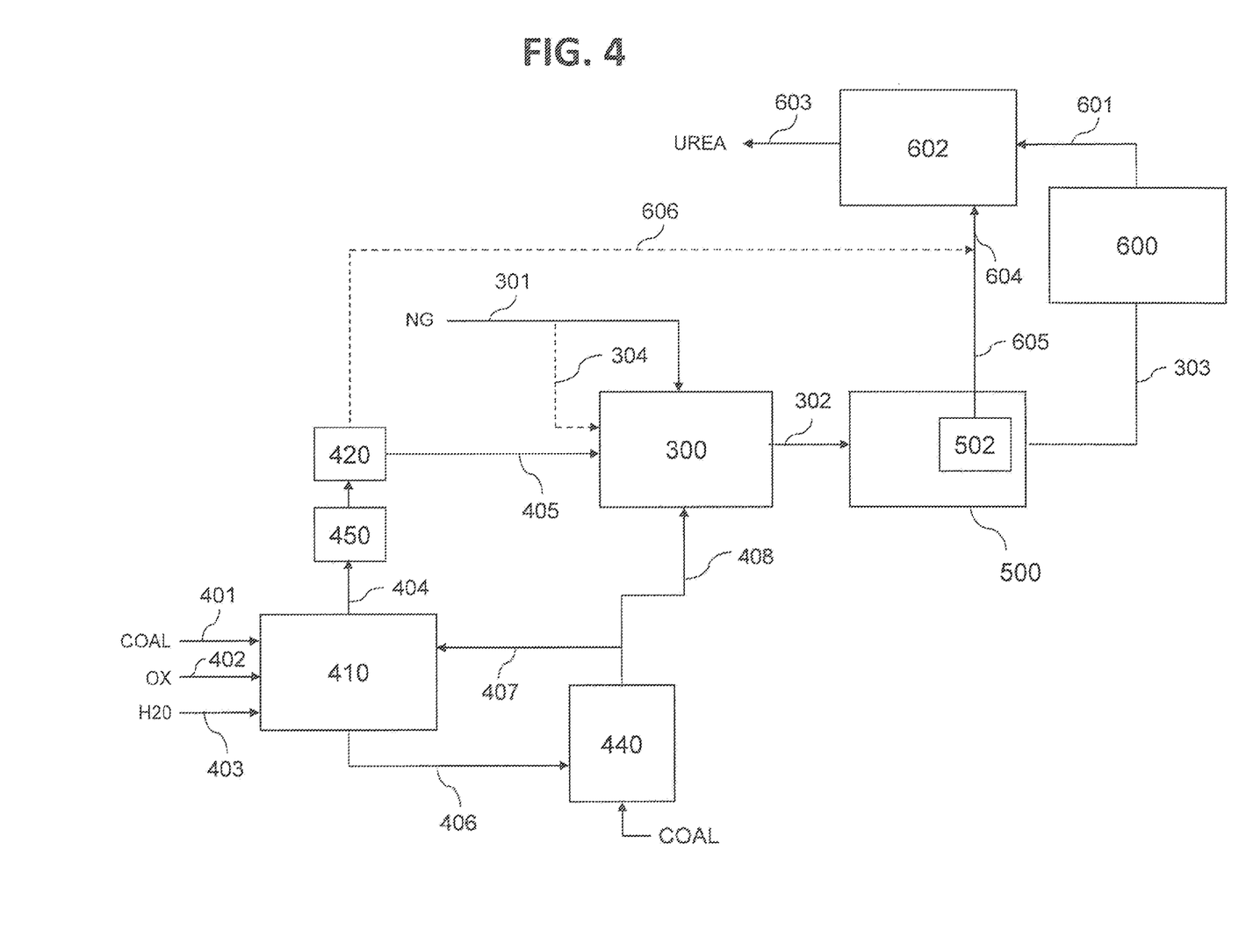
FIG. 4 is a scheme of an embodiment of the invention for ammonia-urea process.

FIG. 4 discloses an embodiment of the invention for implementation in an ammonia-urea plant. Items similar to FIG. 1 have the same reference number.

The syngas 303 is a make-up gas for synthesis of ammonia which is converted into ammonia 601 in an ammonia synthesis section 600. At least some or all of the ammonia 601 is used in a urea section 602 for the synthesis of urea 603 with a carbon dioxide feed 604.

A first portion 605 of the total CO2 requirement 604 for conversion of the ammonia into urea comes from the CO2 removal unit 502, typically comprising an aMDEA or potassium carbonate washing unit, forming part of the purification section 500 of the reformed gas 302.

A second portion 606 of carbon dioxide is obtained from the bulk carbon dioxide separation unit 420. Said second portion 606 is a more substantial part of the total $CO_2$ requirement 604 when the reforming section 300 only comprises a primary steam reformer and most or all the ammonia is converted to urea.

The effluent 404 of the section 410, already desulphurized and before entering the $CO_2$ removal section 420, is directed to a shift reactor 450 to convert the carbon monoxide contained therein into carbon dioxide.

Example 1

An integrated ammonia/urea plant based entirely on natural gas as feed and fuel produces 2200 tonnes/day of ammonia of which approximately 85% is converted into urea, of which the production is accordingly 3300 tonnes/day. Total energy requirement for the integrated plant, which is completely supplied in the form of natural gas, amounts to 5.2 Gcal LHV basis per tonne of urea product, amounting in total to 715 Gcal/h. Of this total natural gas import, 3.1 Gcal/tonne (426 Gcal/h) is required as process feed for the steam reforming process, with the balance of 2.1 Gcal/t (289 Gcal/h) used as fuel in the steam reformer and for the generation and superheating of high pressure steam. The fuel gas of the steam reformer is a mix of a natural gas stream used as fuel, and a synthesis loop purge gas stream which is a by-product of the natural gas conversion to ammonia. The fuel gas of the steam reformer has the following typical properties: Wobbe Index (WI)=40 $MJ/m^3$.

The whole natural gas consumption as fuel can be replaced with a fuel gas generated from coal in a gasification facility as described herein. It is assumed that due to miscellaneous losses the total LHV heating value required would be 10% higher (318 Gcal/h) after conversion from all natural gas firing to all coal-derived fuel gas. A fuel gas stream having a total LHV heating value of 318 Gcal/h can be produced by gasification of 75 tonnes/h of bituminous coal (dry ash-free basis) at 10 bar/1000° C. in a fluidized bed gasifier requiring around 45 tonnes/h of 95% purity oxygen. The gas from the gasifier is cooled for heat recovery in a waste heat boiler and boiler feed water heater; it is scrubbed with water to produce a water saturated gas stream at 180° C.; it undergoes a COS catalytic hydrolysis step to convert substantially all the COS with water to $CO_2$ and $H_2S$; it undergoes a step of $H_2S$ removal by chemical wash with a selective MDEA solution. The gas so produced has WI=10 $MJ/m^3$ (i.e. only 25% of typical value) and a residual $CO_2$ concentration of about 23% mol, dry basis.

According to the present invention, before mixing with the loop purge and use as fuel, the gas is treated in a $CO_2$ PSA for bulk removal of more than 50% of its $CO_2$ content, achieving a WI>15 $MJ/m^3$ (i.e. 38% of typical value); preferably, the PSA separates 75% of its $CO_2$ content; the gas has then a WI=17 $MJ/m^3$ (43% of the typical value) and a residual $CO_2$ concentration of less than 10% mol. Hence, the gas produced by the invention has significantly better chances to be used as replacement of the typical reformer fuel. Moreover, it achieves a substantial reduction of the $CO_2$ that would have otherwise been emitted to the atmosphere.

Example 2

An even better result is achieved by combining methanation and bulk $CO_2$ removal, according to another aspect of the invention. The effluent gas from the MDEA desulphurization of Example 1 undergoes a treatment that includes at least a methanation step. The effluent from this treatment has a $CH_4$ concentration of 29% mol, dry basis, and a $CO_2$ concentration of 49% mol, dry basis. After cooling to 40° C. and water condensate separation, the stream is treated in a $CO_2$ PSA for bulk removal of 50% of its $CO_2$ content, achieving a WI=19 $MJ/m^3$ (i.e. 50% of typical value); preferably, the PSA separates 75% of its $CO_2$ content; the gas has then a WI=25 $MJ/m^3$ (63% of the typical value).

According to another embodiment, the treatment of PSA for bulk $CO_2$ removal could be positioned upstream of the methanation step. In this case, separation of 75% of the $CO_2$ upstream the methanation yields a gas with WI=20 $MJ/m^3$ (50% of the typical value) after cooling to 40° C. and water condensate separation.

Example 3

The plant of example 1 requires a total heat input of 300 Gcal/h. In the conventional ammonia urea complex of example 1, half of the heat (i.e. 150 Gcal/h) is needed for the reformer and half (i.e. 150 Gcal/h) is required for steam generation. As known by those skilled in the art, a typical value of cold gas efficiency of a gasification process is 70%, i.e. the heat value of the gas produced by the gasification is 70% of the heat value of the coal feed.

The efficiency of a typical gas fired heater (such as a steam reformer or a boiler) is 95%. The efficiency of a typical coal fired boiler is 85%.

According to another embodiment of the invention, all the heat is provided by combustion of the gas from the gasifier. In this case, the total coal feed is:

coal feed=(total heat input)/(gasifier cold gas efficiency)×(gas fired heater efficiency)=(300)/(0.7×0.95)=450 Gcal/h.

According to another, preferred embodiment of the invention, the gas produced in the gasifier is only used as reformer fuel, and all the steam consumed by the complex (i.e. by the ammonia, urea, utilities and the gasification plants) is produced in a coal boiler. The ash from the gasifier still containing 5% of the coal feed heat value is fed to the coal boiler. In this case, the coal feed required is calculated as:

coal feed=[(reformer heat input)/(gasifier cold gas efficiency)×(gas fired heater efficiency)+(steam heat input−heat value of ash)/(coal boiler efficiency)]=[150/(0.7×0.95)+(150−8)/0.85]=393 Gcal/h.

The second embodiment is significantly more efficient than the first.

The invention claimed is:

1. A process for manufacturing a hydrogen-containing synthesis gas from a natural gas feedstock including a stage of converting said natural gas feedstock into a raw product gas and purifying said raw product gas, said process includes providing heat input by combustion of a fuel, wherein said process includes producing a gaseous fuel and combusting said gaseous fuel to provide at least part of said heat input to the stage of converting, said process for producing said gaseous fuel comprising:
   a) gasifying a solid or liquid carbonaceous feedstock into a first gaseous product; and
   b) treating said first gaseous product to obtain said gaseous fuel which is not used as a process gas, said treating including at least one of:

b1) removing carbon dioxide with a purity of at least 90% molar; or b2) methanation;

wherein said gaseous fuel has an upper Wobbe Index of at least 14 MJ/Nm$^3$.

2. The process of claim 1, wherein the purity is at least 95%.

3. The process of claim 1, wherein the purity is at least 98%.

4. The process of claim 1, wherein said step b1) of removing carbon dioxide includes removing a fraction of the carbon dioxide content of a processed gas, said fraction is not greater than 90%, thereby leaving a corresponding residual carbon dioxide in said gaseous fuel.

5. The process of claim 4, wherein the fraction is not greater than 75%.

6. The process of claim 1, wherein said step b1) is carried out by adsorption of carbon dioxide on a regenerable solid adsorbent.

7. The process of claim 6, wherein said adsorption includes regenerable pressure swing adsorption.

8. The process of claim 1, wherein said step b2) of methanation is carried out after said step b1) of removing carbon dioxide.

9. The process of claim 8, further comprising recovering heat from said step b2) of methanation by generation of steam.

10. The process of claim 1, wherein the upper Wobbe Index of said gaseous fuel is at least 19 MJ/Nm$^3$.

11. The process of claim 1, wherein the upper Wobbe Index of said gaseous fuel is at least 24 MJ/Nm$^3$.

12. The process of claim 1, wherein said step a) of gasifying is carried out in a fluidized bed.

13. The process of claim 12, wherein ash and/or fine particulate matter produced during said step a) of gasifying is subject to a further combustion in a separate boiler.

14. The process of claim 13, wherein said separate boiler includes a circulating fluid bed coal boiler.

15. The process of claim 14, wherein said separate boiler produces steam and said steam is used in said step a) and/or in said stage of converting said natural gas feedstock and/or in said purification of said raw product gas.

16. The process of claim 12, wherein said step a) of gasifying includes moderating a gasification temperature with a moderator, and wherein said moderator is other than water.

17. The process of claim 16, wherein said moderator includes nitrogen.

18. The process of claim 16, wherein said moderator includes nitrogen, and wherein the moderator is admitted to the gasification process either: i) by a dedicated feed of nitrogen, or ii) together with oxygen by a feed of air or oxygen-enriched air.

19. The process of claim 1, wherein the step b) of treating includes:

i) a step of catalytic hydrolysis of the carbonyl sulfide (COS), thereby producing a gas with a reduced content of carbonyl sulfide and an increased content of hydrogen sulfide ($H_2S$);

ii) a step of $H_2S$ separation by via a wash with a liquid solution with affinity to capture $H_2S$ that produces a sour $H_2S$-rich stream and a gas stream with reduced $H_2S$ content; and iii) feeding the gas stream with reduced $H_2S$ content to any of step b1 or step b2.

20. The process of claim 19, wherein said step of $H_2S$ separation by via a wash with a liquid solution with affinity to capture $H_2S$ includes an MDEA wash selective for $H_2S$ over $CO_2$.

21. The process of claim 1, wherein said carbonaceous feedstock includes at least one of coal, lignite, coal-derived coke, petroleum coke, or heavy fuel oil; and wherein said step of conversion into gaseous fuel is a gasification process.

\* \* \* \* \*